(12) United States Patent
Zivanovic et al.

(10) Patent No.: US 9,562,636 B2
(45) Date of Patent: Feb. 7, 2017

(54) ANCHORING DEVICE WITH SPACER FOR HOOPING REINFORCEMENTS

(71) Applicant: SOLETANCHE FREYSSINET, Rueil Malmaison (FR)

(72) Inventors: Ivica Zivanovic, Arnouville (FR); Antoine Carry, Versailles (FR); Ronan Solet, Sevres (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 111 days.

(21) Appl. No.: 14/581,449

(22) Filed: Dec. 23, 2014

(65) Prior Publication Data

US 2015/0176734 A1 Jun. 25, 2015

(30) Foreign Application Priority Data

Dec. 24, 2013 (FR) ...................... 13 63546

(51) Int. Cl.
| | | |
|---|---|---|
| *F16B 2/08* | (2006.01) | |
| *F16L 33/10* | (2006.01) | |
| *E04H 7/20* | (2006.01) | |
| *E04G 21/12* | (2006.01) | |
| *E04C 5/16* | (2006.01) | |
| *E04C 5/12* | (2006.01) | |

(52) U.S. Cl.
CPC .................. *F16L 33/10* (2013.01); *E04C 5/12* (2013.01); *E04C 5/16* (2013.01); *E04G 21/12* (2013.01); *F16B 2/08* (2013.01); *Y10T 24/1412* (2015.01)

(58) Field of Classification Search
CPC .............. E04C 5/12; E04C 5/16; E04G 21/22; Y10T 24/1476; Y10T 24/1455; Y10T 24/1437; Y10T 24/1449; F16L 33/06; F16B 2/08
See application file for complete search history.

(56) References Cited

U.S. PATENT DOCUMENTS

| | | | | |
|---|---|---|---|---|
| 1,086,295 A | * | 2/1914 | Hillman | ..................... E04H 7/20 217/4 |
| 3,329,296 A | * | 7/1967 | De Muth | ................... E04H 7/28 217/95 |
| 3,722,158 A | * | 3/1973 | Dykmans | ................... E04H 7/20 52/223.13 |
| 7,234,280 B2 | * | 6/2007 | Nieto | ......................... E04H 7/20 52/223.13 |
| 2004/0139670 A1 | | 7/2004 | Nieto et al. | |

FOREIGN PATENT DOCUMENTS

| | | |
|---|---|---|
| GB | 1573307 A | 8/1980 |
| WO | 02075069 A1 | 9/2002 |

* cited by examiner

*Primary Examiner* — Robert J Sandy
(74) *Attorney, Agent, or Firm* — Dentons US LLP

(57) ABSTRACT

An anchoring device including two reinforcements for applying a hooping stress to a tubular structure, each of the reinforcements having a main binding portion which bears against the surface of the structure over 2 turns, a first end arranged at the end of a first end portion, and a second end arranged at the end of a second end portion. The anchoring device includes a spacer including a main body and two pairs of anchoring openings for the two ends of each reinforcement. The first and second end portions extend from a radial plane, where the reinforcements are tangential to the surface, then extend away from the surface from the radial plane as far as the anchoring openings so as not to exert a harmful point force on the structure.

9 Claims, 5 Drawing Sheets

Figure 1:
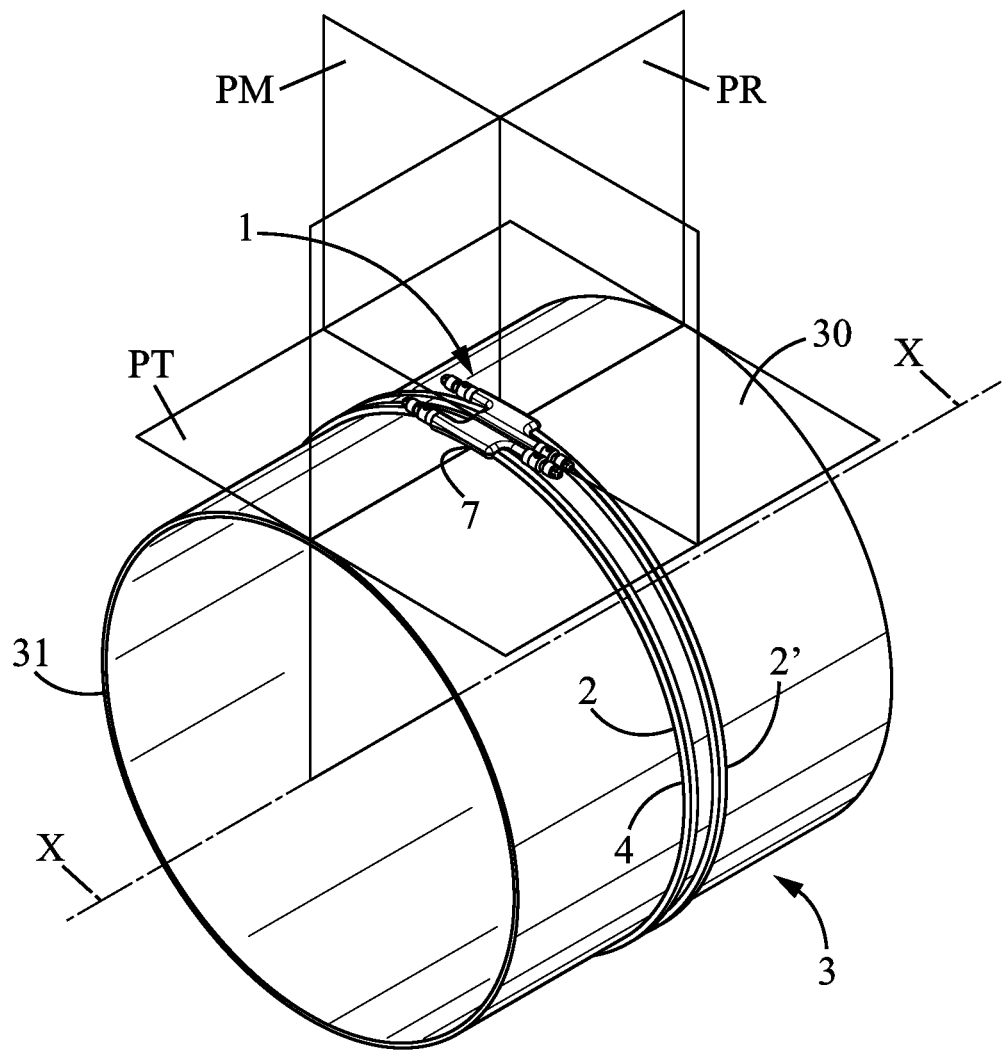

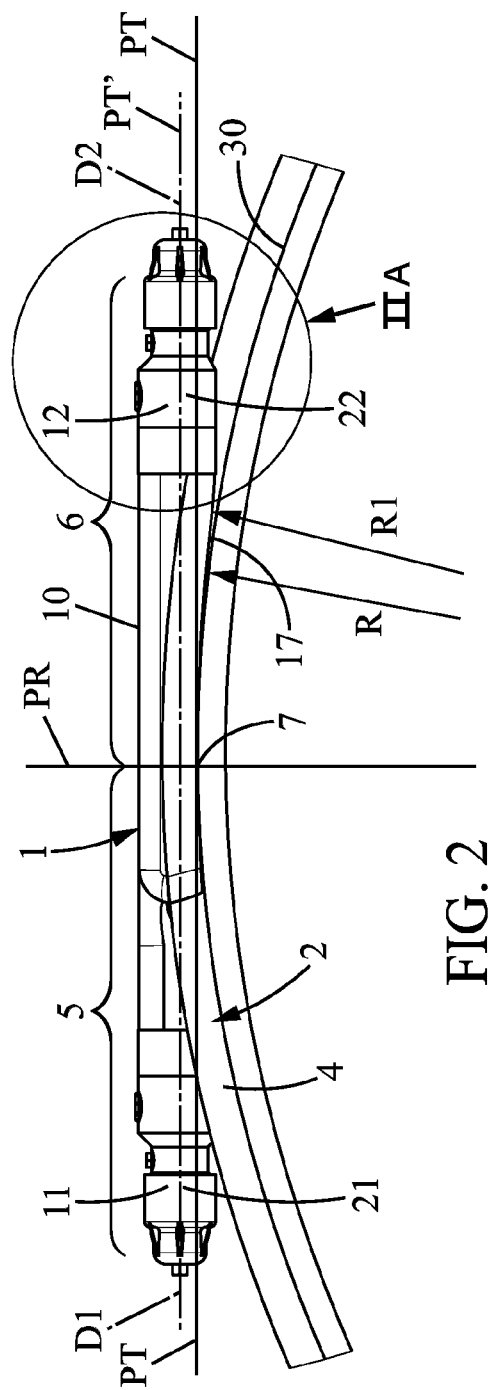
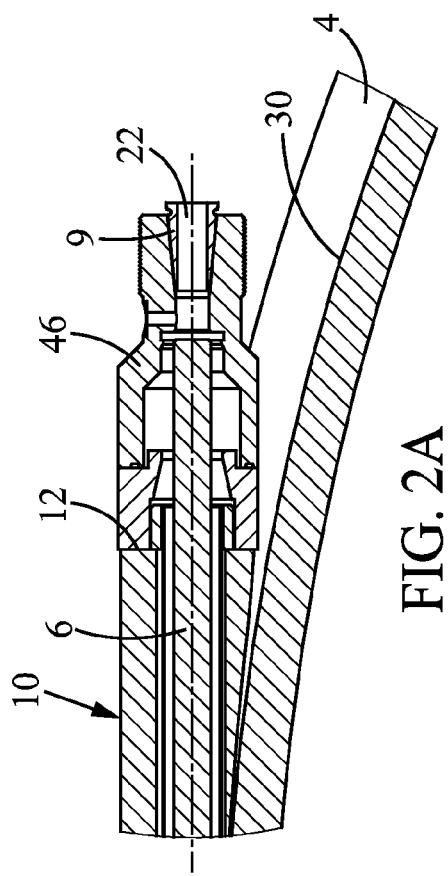
FIG. 2
FIG. 2A

ANCHORING DEVICE WITH SPACER FOR HOOPING REINFORCEMENTS

This application claims priority to French Application No. 13 63546, filed Dec. 24, 2013, of which is incorporated by reference for all purposes as if fully set forth herein.

The present invention relates to anchoring devices for anchoring hooping reinforcements around a structure to be stressed.

More particularly, the invention relates to a device for anchoring two prestress reinforcements for applying a hooping stress to a tubular structure to be stressed, each of the reinforcements having a main binding portion which surrounds the surface of the structure to be stressed over at least one turn, a first end and a second end, and an anchoring block in which are anchored the first and second ends of each reinforcement.

Such a configuration is known from document FR2822177. However, in the configuration described, when the reinforcements are placed in tension, the anchoring block exerts an inward radial pressure on the structure to be stressed, and this pressure may locally be greater than the distributed pressure exerted by the reinforcements.

This drawback is particularly problematic when stress is to be applied to a tubular structure having a slender wall, such as a medium-thickness pipe or more generally a relatively thin-walled complex structure.

A need has therefore arisen to propose solutions whereby it is possible to stress a relatively thin-walled convex, and in particular cylindrical, structure while avoiding the creation of a singularity (a concentration) of radial pressure at the location of the anchoring block.

To that end, there is proposed a device for anchoring at least two prestress reinforcements for applying a hooping stress to a tubular structure to be stressed, which structure is at least partially cylindrical having an axis X, each of the reinforcements having:
- a main binding portion which surrounds and bears against the surface of the structure to be stressed over N turns, N being a non-zero integer,
- a first end arranged at the end of a first end portion in the extension of the main portion on one hand,
- a second end arranged at the end of a second end portion in the extension of the main portion on the other hand.

The anchoring device comprises a spacer comprising a main body and at least two pairs of anchoring openings for receiving and anchoring the two ends of each reinforcement, the first end being anchored in a first anchoring attachment, and the second end being anchored in a second anchoring attachment, the spacer being arranged symmetrically on either side of a median plane PM of the spacer arranged perpendicular to the axis X.

The first end portion extends from a radial plane PR, parallel to and containing the axis X, where the reinforcement is tangential to the surface of the structure, then extends away from the surface of the structure from said radial plane as far as the first anchoring attachment, and the second end portion extends, counter to the first, from the radial plane where the reinforcement is tangential to the surface of the structure, then extends away from the surface of the structure from said radial plane as far as the second anchoring attachment.

The result is that the end portions are subjected, close to the radial plane PR, to a force which remains purely circumferential and, consequently, the anchoring device exerts no additional radial pressure on the structure to be stressed.

By virtue of these provisions, the advantageous result obtained is that the resultant of the forces exerted by the end portions on the spacer comprises no radial component, and therefore the spacer may be considered to be 'floating', that is to say with no significant pressure on the surface of the structure.

In various embodiments of the invention, it is further possible optionally to have recourse to one or more of the following provisions.

Advantageously, the first anchoring attachment is formed by a first anchoring opening and the second anchoring attachment is formed by a second anchoring opening; it is thus expedient to install reliable and robust anchoring means such as conical anchoring jaws, for a reinforcement of substantially circular cross section.

The radial plane may advantageously be halfway between the first and second anchoring openings; by means of this, a balanced geometric configuration on either side of the radial plane is obtained, with similar access to the first and second ends of the reinforcement.

A tangential plane may be defined perpendicular to the median plane and to the radial plane and adjacent to the surface of the structure, and the first anchoring opening being centred on a first anchoring axis and the second anchoring opening being centred on a second anchoring axis, the first and second anchoring axes being angularly spaced from the tangential plane at most by an angle of 30 degrees. It is thus possible to choose the anchoring axes optimally to facilitate access to the anchoring openings, in particular for installing the tensioning tooling.

The first and second anchoring axes may be collinear and parallel to the tangential plane PT; thus, the spacer is a part which is relatively simple and easy to produce.

The first and second anchoring axes may be arranged away from the structure to be protected with respect to the tangential plane, angularly spaced with respect to the tangential plane by an angle between 0° and 20°; access is thus facilitated to the tooling for applying the prestress such as an actuator or the like, without thereby creating, in the spacer, excessive radial forces or shear stresses.

The first and second anchoring openings may be arranged at a distance from one another in a substantially circumferential direction, separated by a predetermined distance greater than Emin. Thus, the available space around the anchoring openings is sufficient, and it is thus possible to facilitate access for the tooling to the anchoring openings.

The body of the spacer may have a concave face oriented toward the structure to be stressed, with a radius of curvature R1 greater than or equal to the radius of curvature R of the surface of the structure close to the tangential plane. This facilitates the positioning operations prior to tensioning, without creating a point stress on the surface 30 of the structure after stressing.

Each reinforcement may be a metal strand having 7 wires, surrounded by at least one outer sheath (HDPE plastic) bearing against the surface to be stressed, with a lubricating product therebetween which allows the strand to slide easily with respect to said outer sheath. The strand is greased for protection and lubrication and then sheathed. This sheathed strand may itself be inserted into an overall protective sheath (HDPE plastic) and, before tensioning, a filler product (such as cement slurry) may be injected into the space between the outer sheath and the sheathed strand. Thus, there is proposed a high-performance and controlled solution as a hoop prestressing means, with proper sliding of the strand in the sheath and the injection into the annular space between the reinforcement and the overall sheath allowing even and uniform stressing.

Furthermore, it is possible to provide a flattening for pressing onto the surface and this ensures a good distribution of the forces by means of the flattening of the sheath.

Each reinforcement advantageously performs exactly two turns, thus N=2, and the main body of the spacer comprises a channel forming a passage arranged axially between the first and second anchoring openings. This makes it possible to better distribute the radial stresses over the surface of the structure to be stressed and to bring about a greater density of prestress for one and the same anchoring part, in addition without reinforcements crossing.

The spacer may be a one-piece metal part, for example made of cast iron. Thus, such a spacer is solid enough to withstand very high reaction forces from the prestress.

The invention also relates to an anchoring spacer specially suited to and designed for forming an anchoring device as described above, comprising a main body and at least two pairs of anchoring openings for receiving and anchoring ends of a pair of reinforcements.

Figure 3:
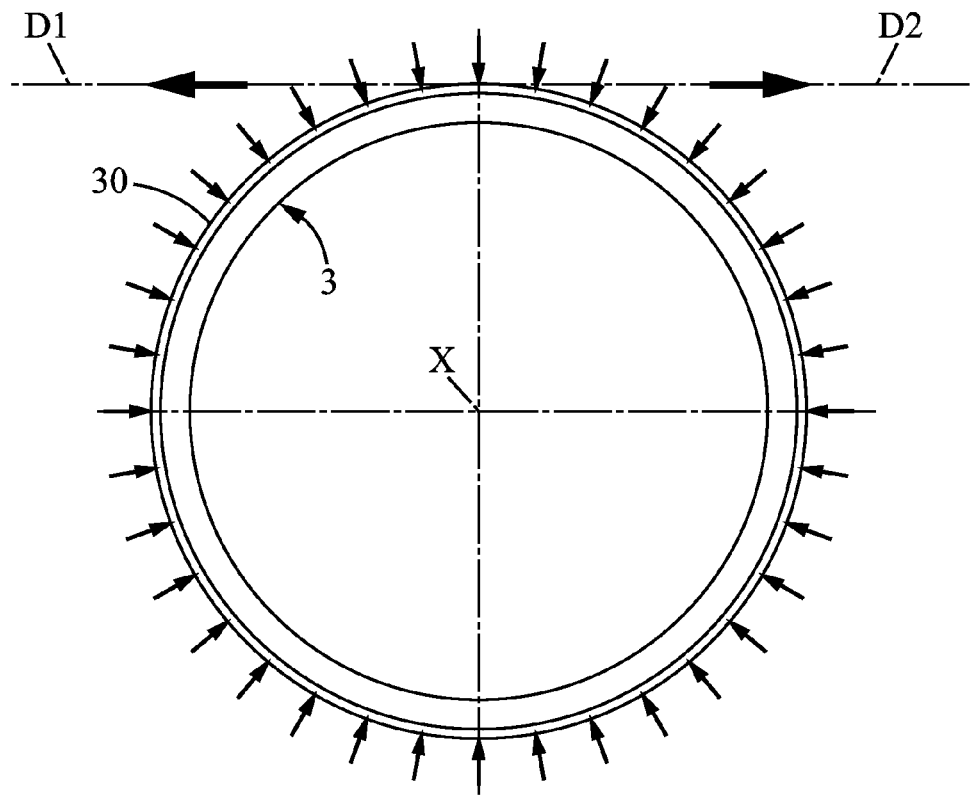
Figure 4:
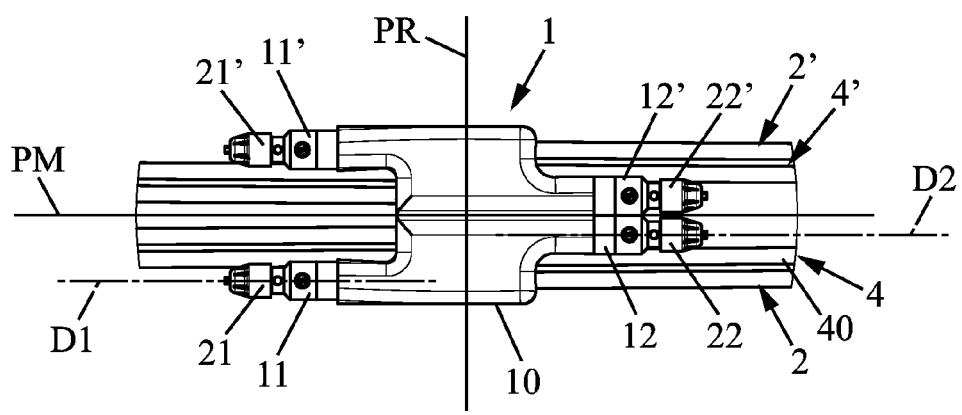
Figure 5:
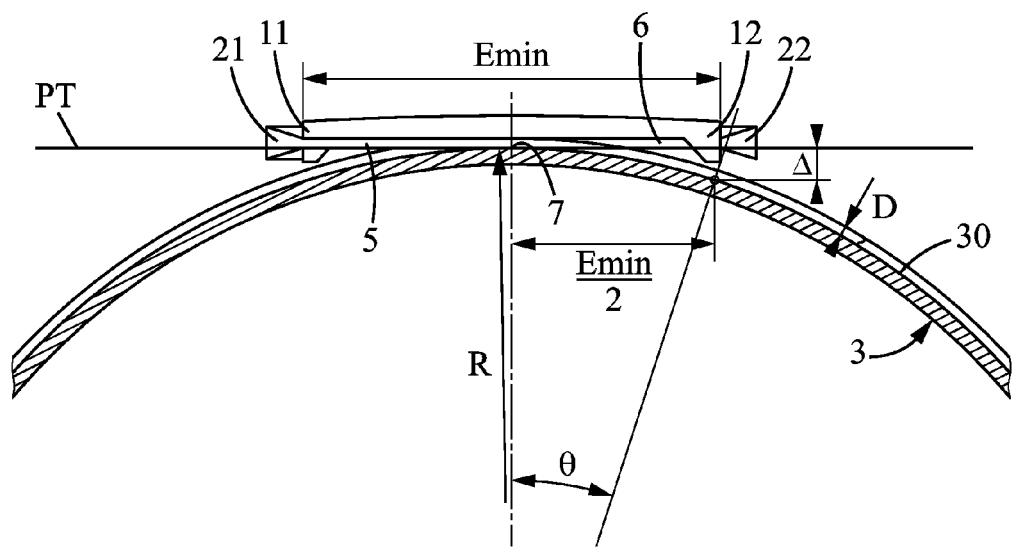
Figure 6:
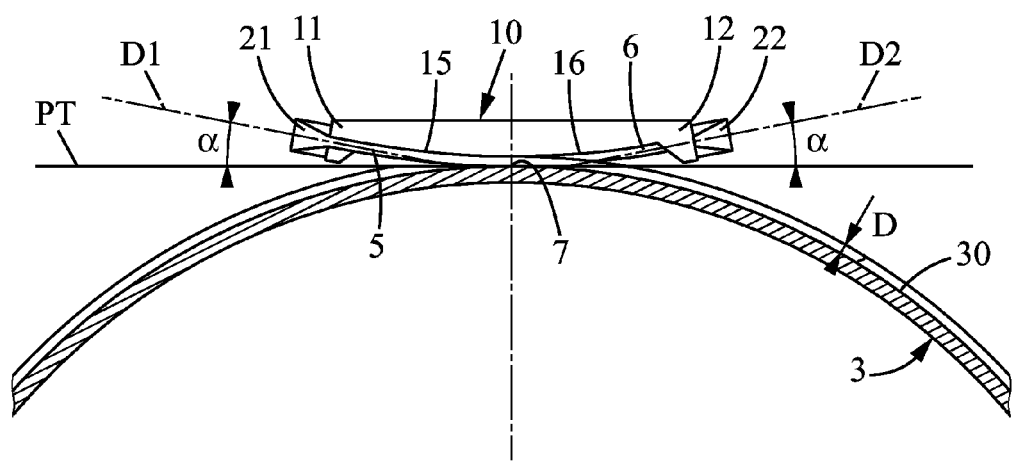
Figure 7:
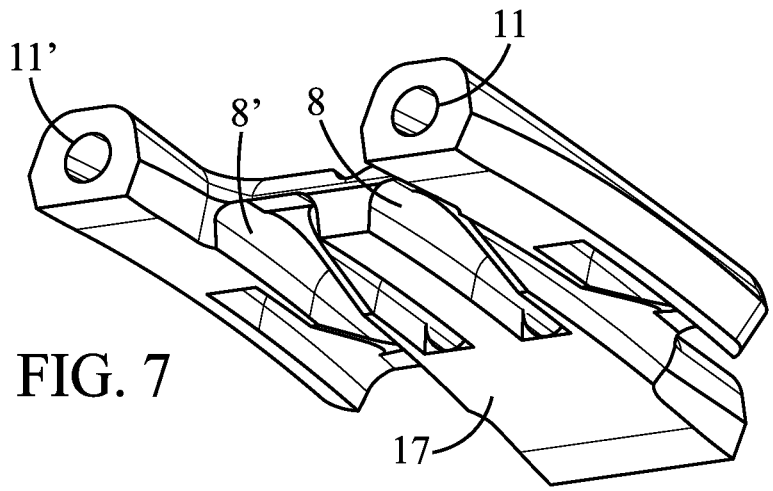
Figure 8:
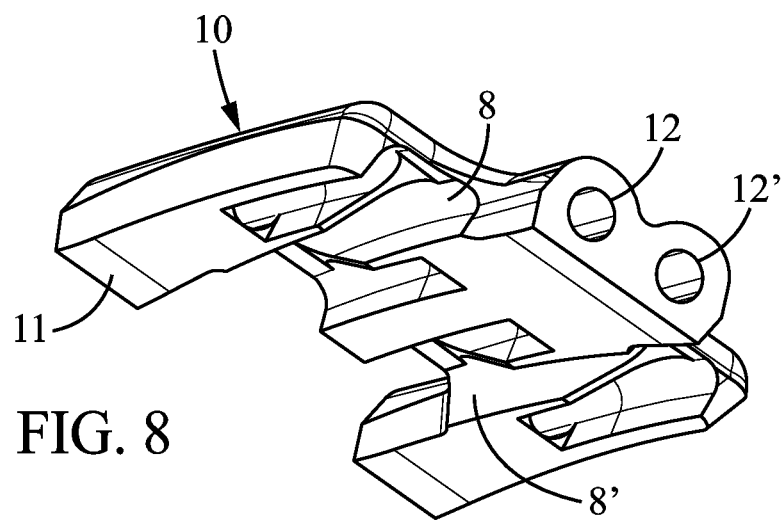
Figure 9:
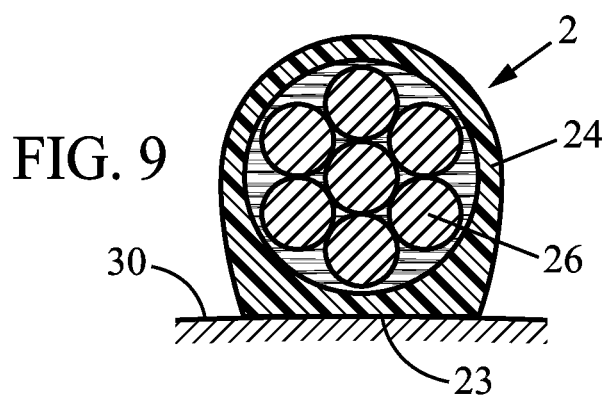

Other aspects, aims and advantages of the invention will become apparent upon reading the following description of several embodiments of the invention, given by way of non-limiting examples. The invention will also be better understood with reference to the appended drawings, in which:

FIG. 1 is a schematic perspective view of a hooping system with its anchoring device according to the invention, FIG. 2 is a view in cross section of the anchoring device of FIG. 1, and FIG. 2A shows in greater detail one of the end anchors, FIG. 3 shows in cross section the forces exerted by the hooping system of FIG. 1, FIG. 4 is a top view of the anchoring device, FIG. 5 is a schematic geometric view in cross section of the anchoring device of FIG. 1, FIG. 6 is similar to FIG. 5 and shows a second embodiment of the device, FIGS. 7 and 8 show perspective views of the spacer, FIG. 9 shows a view in section of a reinforcement.

In the various figures, the same references designate identical or similar elements.

FIG. 1 is a schematic view showing a portion of tubular structure 3 around which a hooping stress is to be applied by means of a hooping system. In particular, an inward radial stress is to be applied in order to strengthen the structure in question. In the example shown, this tubular structure is a revolved cylinder centred on an axis X. The wall 31 of the tubular structure is relatively thin with respect to the diameter of the structure and it is therefore desirable to distribute, as evenly as possible, the inward radial forces applied to the outer surface 30 of the structure, and to avoid a singularity at the anchor.

Of course, in configurations not shown here, the tubular structure could be only partially cylindrical; equally, the cylinder is not necessarily a revolved shape, the basic curve of the cylinder could be ovoid, elliptical or of any other closed convex shape.

The illustrated example shows a hollow tubular duct having a thin wall 31, wherein this wall may typically be made of metal. It may be a duct for liquid or gas within which a high pressure may prevail, hence the usefulness of applying a hooping prestress in order to avoid or to limit the occurrence of harmful tensile stresses within the wall 31 of the tubular duct.

To that end, the outer surface 30 of the tubular structure 3 is surrounded with two reinforcements 2, 2' whose makeup will be specified below; advantageously, the second reinforcement 2' is arranged symmetrically opposite the first reinforcement 2 with respect to a median plane referenced PM, perpendicular to the axis X of the structure 3.

Each of the reinforcements 2, 2' comprises a main portion 4, termed the binding portion, which surrounds the structure and bears against the surface 30 of the structure to be stressed over 2 turns in the example shown.

More generally, each reinforcement may perform N turns around the outer surface of the structure, N being a non-zero integer. N may be equal to 1, 2, 3 or more.

The reinforcement 2 comprises on one hand a first end portion 5 in the extension of the main portion of a first side, and which ends in a first end 21. On the other hand, the reinforcement 2 comprises a second end portion 6 in the extension of the main portion of a second side, and which ends in a second end 22.

The first and second end portions 5, 6 are located at a spacer 1 provided in order to form an anchoring device for the reinforcements, by being interposed between their ends.

More precisely, the first end 21 is anchored in a first anchoring opening 11 created in the spacer 1, and the second end 22 is anchored in a second anchoring opening 12, also created in the spacer 1 but on the opposite side in the circumferential direction.

In the case shown, the reinforcement is a strand consisting of steel wires, of substantially circular cross section, as is known per se. The device and the method for anchoring such a reinforcement in an anchoring opening conventionally makes use of conical jaws 9. Such a device and the associated method for imparting a prestress and anchoring the reinforcement are described in the document FR2822177. In the example shown (FIG. 2a), use is made of an intermediate bearing part labeled 46, interposed between the attachment for the jaws 9 and the anchoring opening 12 belonging to the spacer 1. Greasing, known per se, is also provided for protection and lubrication.

The spacer 1 takes the form of a one-piece part comprising a solid body 10, with the abovementioned two anchoring openings 11, 12 for the first reinforcement, and two other anchoring openings 11', 12' for the second reinforcement 2' arranged symmetrically with respect to the median plane PM of the reinforcements.

Given that the spacer is symmetric with respect to said median plane PM, the following description will relate principally to the first reinforcement 2; anything relating to the second reinforcement 2' and its anchoring can be deduced by mirroring the first reinforcement 2 with respect to the median plane PM.

The spacer 1 may be made of metal, for example of cast iron or of steel. It could also be made of reinforced concrete or a composite material, or any other material which is able to withstand these anchoring forces.

The spacer 1 works essentially in compression (in its straight-line configuration), as it is interposed between the reinforcement ends 21, 22 which each extend, beyond a radial plane, from the end portions 5, 6 of the reinforcement.

It is possible to define a tension plane PT' as a plane parallel to the axis X and passing through the respective attachments of the first 11 and second 12 anchoring openings.

Moreover, it is possible to define a tangential plane PT as a plane parallel to the tension plane PT' and moreover adjacent to the surface 30 of the structure to be stressed.

Also defined is a radial plane PR which is perpendicular to the tangential plane PT (and thus to the tension plane PT') and which passes through the axis X.

There is another way to define the radial plane PR. Advantageously according to the invention, this involves the first end portion 5 extending from a point 7, which can be defined as belonging to the radial plane PR, where the reinforcement is tangential to the surface 30, then extending away from there from said point 7 (defining the radial plane PR with the axis X) as far as the first anchoring opening 11, and the second end portion 6 extending, counter to the first, from said radial plane PR where the reinforcement is tangential to the surface 30, then extending away from the surface from said radial plane PR as far as the second anchoring opening 12.

In other words, the radial plane PR corresponds to and coincides with an external generatrix 7 of the cylindrical surface 30, in line with which each of the end portions "takes off" tangentially from the surface in opposite directions which meet in the circumferential direction.

Another way to define the tangential plane PT mentioned above consists in determining a plane perpendicular to the radial plane PR and passing through the abovementioned external generatrix 7.

As a consequence, the following result is obtained: the main portion 4 performs exactly two turns (no more, no less) in contact with the surface of the structure, and extends away therefrom at the tangential plane PT.

Although the illustrations present "balanced" configurations, in which the radial plane PR is halfway between the first 11 and second 12 anchoring openings, it is possible to have asymmetry with respect to the radial plane PR with one of the anchoring openings further removed on one side, which makes it possible to promote access for a tensioning tooling around this further removed anchoring opening.

Advantageously according to the invention, taking into account the presented geometric configuration, the resultant of the forces exerted by the two end portions 5, 6 on the spacer can be deduced from the forces experienced by the two end portions at this radial plane PR; at this point, they are purely axial along the reinforcements with no radial component on the structure. Consequently, the resultant of these forces induces no substantial radial component which would cause significant pressure from the spacer on the surface of the structure subjected to the stress.

As is apparent from FIGS. 2-6, the first anchoring opening 11 makes it possible to define a first anchoring axis denoted D1, and the second anchoring opening 12 makes it possible to define a second anchoring axis denoted D2.

As shown in FIG. 3, a force radial component is then obtained which is entirely even and substantially uniform over the entire periphery of the structure to be stressed, with no singularity (concentrated radial or point force) at the anchoring device.

As shown in FIG. 4, the second reinforcement 2' is symmetric with the first reinforcement 2 with respect to the median plane PM, and its main portion 4' and its ends 21', 22' are respectively symmetric with the main portion 4 and ends 21, 22 of the first reinforcement 2. The same is true for the anchoring openings 11', 12' for the second reinforcement, which are symmetric with the abovementioned anchoring openings 11, 12 for the first reinforcement 2.

As shown in FIG. 5, it is provided that the anchoring openings are positioned at a certain distance from the radial plane PR so as to obtain a large enough space around each opening for installing the tension tooling (tensioning the reinforcements). More precisely, the first and second anchoring openings are spaced apart by a distance Emin which is selected so as to be sufficiently large, taking into account the radius of curvature R of the structure 3 close to the radial plane PR and the outer diameter D of the reinforcement 2, such that there exists, between the anchoring opening 11, 12 and the wall of the structure covered by the reinforcement, a gap A allowing the tooling for tensioning the reinforcement to be put in place and actuated.

As shown in FIG. 6, it is not necessary for the anchoring axes D1, D2 to be mutually collinear and parallel to the tangential plane PT. In point of fact, in this variant, the spacer has a convex curved outer face with a first convex portion 15 corresponding to the attachment of the first end portion of the reinforcement and a second convex portion 16 corresponding to the attachment of the second end portion of the reinforcement. The condition of tangentiality at the point of tangentiality 7 remains satisfied without the anchoring axes being parallel to the tangential plane. In this case, each of the anchoring axes is angularly spaced from the tangential plane by an angle α less than 30°. The angle α will preferably be chosen between 0° and 20°.

As shown in FIGS. 2, 7 and 8, the spacer has a lower face 17, specifically the face oriented toward the structure to be reinforced, with a concave shape.

The concave face 17 oriented toward the structure to be stressed has a radius of curvature R1 greater than or equal to the radius of curvature R of the surface of the structure 30 close to the tangential plane. Thus, any localized stress is avoided during installation and during the prestressing phase.

However, it is also possible to have a flat inner surface or a curved inner surface as shown in FIG. 6.

The main body 10 of the spacer comprises a channel 8 which forms a free passage for the median portion 40 of the reinforcement which simply passes through without being anchored. It will be noted that each of the channels 8, 8' is arranged axially between the first and second anchoring openings.

As shown in FIG. 9 and known per se, the reinforcement 2 shown comprises for example seven metal wires 26 protected by a sheath 24 which may be greased internally. An overall protective sheath may be added to the sheathed and greased reinforcement. In this case, it is possible to inject a filler and protecting product (such as cement slurry) between said overall outer sheath and the sheathed strand. In this configuration, the injection takes place before tensioning the reinforcements. Moreover, the individual protective sheath of the reinforcement may have a bearing flattening 23 designed to bear against the outer surface.

It is to be noted that, instead of the reinforcements shown, it is possible to use composite reinforcements, of the same or different cross section, or even straps which would be tautened and anchored by means of ratchet drums, or by means of flat jaw systems. In this case, the anchoring openings would be replaced by a more general notion of "anchoring attachments" against which the ratchet drums or the flat jaws would press, and these anchoring attachments could take the form of shoulder slots, journals or other shapes acting as a retaining surface.

Equally, the reinforcements shown may consist solely of strands having 7 bare metal wires with no individual sheath. It is also not necessary that they be contained in an overall sheath, depending on the environment and requirements. Or any other alternative among the cases described above (bare reinforcements in an overall sheath, for example).

It is also to be noted that a given spacer may be suitable for many anchoring devices placed on various structures with in particular different or very different radii of curvature R.

For a duct to be prestressed over a certain length, multiple hooping systems are placed at regular intervals along the duct.

The invention claimed is:

1. An anchoring device, comprising:
   at least two pre-stress reinforcements for applying a hooping stress to a tubular structure to be stressed, which structure is at least partially cylindrical having an axis X, each of the reinforcements having:
      a main binding portion which surrounds and bears against the surface of the structure to be stressed over N turns, N being a non-zero integer,
      a first end arranged at the end of a first end portion in an extension of the main portion on one side, and
      a second end arranged at the end of a second end portion in an extension of the main portion on an opposite side,
   a spacer comprising:
      a main body and at least two pairs of anchoring openings for receiving and anchoring the two ends of each reinforcement, the first end of each reinforcement being anchored in a first anchoring attachment, and the second end of each reinforcement being anchored in a second anchoring attachment,
      the spacer being arranged symmetrically on either side of a plane, called median plane of the spacer, said median plane being arranged perpendicular to the axis X,
   wherein said first end portion in an extension of the main portion on one side extends from a radial plane, parallel to the axis X, where said reinforcement is tangential to the surface of the structure, then extends away from the surface of the structure from said radial plane as far as the first anchoring attachment, and
   wherein said second end portion in an extension of the main portion on the opposite side extends counter to the first end portion, from the radial plane where said reinforcement is tangential to the surface of the structure, then extends away from the surface of the structure from said radial plane as far as the second anchoring attachment.

2. The anchoring device of claim 1, in which the radial plane is halfway between the first and second anchoring attachments.

3. The anchoring device of claim 1, in which a tangential plane is defined perpendicular to the median and radial planes and adjacent to the surface of the structure, and in which the first anchoring attachment has a first anchoring opening centered on a first anchoring axis and the second anchoring attachment has a second anchoring opening centered on a second anchoring axis, said first anchoring axis and said second anchoring axis being angularly spaced from the tangential plane at most by an angle of 30°.

4. The anchoring device of claim 3, in which said first anchoring axis and said second anchoring axis are collinear and parallel to the tangential plane.

5. The anchoring device of claim 3, in which said first anchoring axis and said second anchoring axis are arranged away from the structure to be stressed with respect to the tangential plane, angularly spaced with respect to the tangential plane by an angle between 0° and 20°.

6. The anchoring device of claim 1, in which the body of the spacer has a concave face oriented toward the structure to be stressed, with a radius of curvature greater than or equal to the radius of curvature of the surface of the structure close to the tangential plane.

7. The anchoring device of claim 1, in which each reinforcement is a metal strand having 7 wires, surrounded by at least one outer sheath bearing against the surface to be stressed, with a lubricating product therebetween which allows the strand to slide easily with respect to said outer sheath.

8. The anchoring device of claim 1, in which each reinforcement may perform two turns, thus N=2, and the main body of the spacer comprises a channel forming a passage arranged axially between the first and second anchoring openings.

9. The anchoring device of claim 1, in which the spacer is a one-piece metal part.

* * * * *